Aug. 24, 1948.  P. L. CRITTENDEN  2,447,686
COMPRESSOR VALVE MECHANISM
Filed Dec. 23, 1943
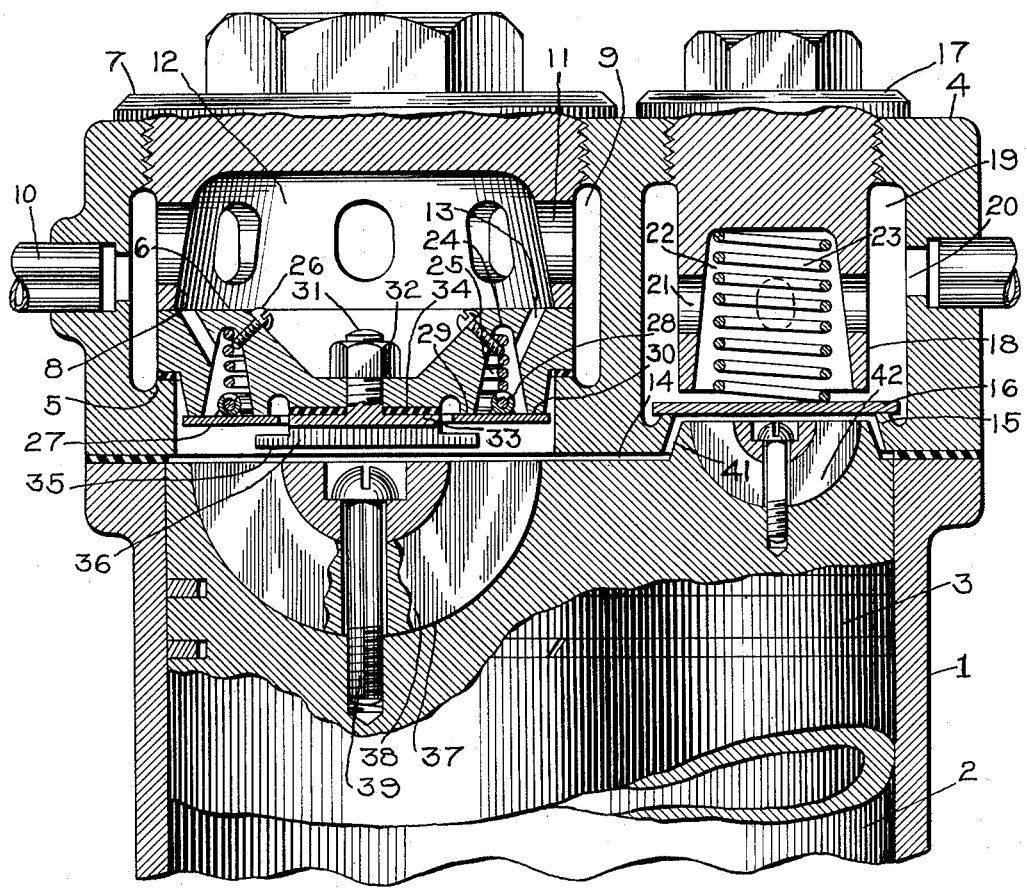
INVENTOR
Philip L. Crittenden
BY
ATTORNEY Patented Aug. 24, 1948

2,447,686

UNITED STATES PATENT OFFICE 2,447,686

COMPRESSOR VALVE MECHANISM

Philip L. Crittenden, Edgewood, Pa., assignor to The Westinghouse Air Brake Company, Wilmerding, Pa., a corporation of Pennsylvania Application December 23, 1943, Serial No. 515,365

6 Claims. (Cl. 230—24)

This invention relates to fluid compressors and more particularly to those of the reciprocating piston type.

An object of the invention is to provide a fluid compressor with an improved inlet and discharge valve mechanism wherein the valves are operated more promptly than heretofore to obtain a more efficient operation of the compressor.

Another object of the invention is to provide a fluid compressor of the reciprocating piston type in which the clearance between the piston and the cylinder head is reduced to a minimum so that as little fluid under pressure as possible is expanded in the downward movement of the piston before the inlet valve is unseated. Since this piston movement is unproductive, any reduction in the amount of this movement will directly increase the efficiency of the compressor.

A further object is to provide in the piston of a fluid compressor, auxiliary magnetic means which will aid in the prompt operation of the valves and which will not require any more clearance volume than that required by the piston alone.

As shown in the accompanying drawing, which is a fragmentary sectional view of a compressor head assemblage, the invention is embodied in a fluid compressor comprising a cylinder casing 1 which is provided with a vertical bore 2. In this bore a piston 3 is slidably mounted to reciprocate and compress fluid in the usual manner. Secured to the top of the cylinder casing 1 by bolts or other suitable means is a cylinder head 4 which is provided with vertically disposed circular openings which are open at their lower ends to the bore 2, one of the openings constituting a portion of the fluid inlet communication of the compressor and the other a portion of the fluid discharge communication of the compressor.

Within the fluid inlet opening located at the left-hand side of the cylinder head 4, as illustrated, and a short distance above the bottom thereof, there is formed in the head an upwardly extending annular lug 5 upon which is supported a valve carrier member 6.

The upper end of the inlet opening is closed by means of a hollow nut member 7 which has screw-threaded engagement with the head 4. The lower portion of this nut member comprises a vertically disposed annular wall 8, the bottom surface of which abuts the upper surface of the valve carrier member 6 so that, when the nut member is screwed in place, the valve carrier member is rigidly secured thereby to the annular lug 5.

Above the annular lug 5 and below the screw-threaded connection between the nut member 7 and the head 4 the opening is enlarged to a greater diameter than that of the outer surface of the annular wall 8, so that the head, the annular wall, and the valve carrier member 6 define a chamber 9 which is in constant open communication with a fluid inlet passage 10. This chamber is also in constant open communication, through a plurality of apertures 11 in annular wall 8, with a chamber 12 which is defined by the interior surface of the nut member 7 and the valve carrier member 6.

This valve carrier member is provided with a plurality of fluid inlet passages 13 through which fluid may flow from the chamber 12 to a fluid compression chamber 14 which is defined by the piston 3, the wall of the bore 2, head 4, the valve carrier member 6 and a discharge valve 16.

From this chamber fluid may flow under pressure to a vertically disposed annular discharge opening located in the right-hand side of the cylinder head 4, as illustrated. Within this discharge opening and a short distance above the bottom face of the head there is formed therein an upwardly extending annular seat rib 15 which is operatively engaged by the disc-shaped discharge valve 16.

The upper end of the discharge opening is closed by means of a hollow nut member 17 which has screw-threaded engagement with the head 4. The lower portion of the nut member 17 comprises a vertically disposed annular wall 18, the bottom surface of which acts as a stop for the upward movement of the valve 16 when the member is screwed in place.

The opening above the seat rib 15 and below the screw-threaded connection between the nut member 17 and the head 4 is enlarged to a greater diameter than that of the outer surface of the annular wall 18, so that the head and the annular wall define a chamber 19 which is in constant open communication with a fluid discharge passage 20. This chamber is also in constant open communication, through a plurality of apertures 21 in annular wall 18, with a recess 22 within the nut member 17. Contained in the recess and interposed between the nut member and the discharge valve 16 is a helical spring 23 which constantly exerts a downwardly directed force upon the upper surface of the valve.

In the bottom surface of the valve carrier member 6, which is secured in the bottom of the inlet opening, there is provided an annular recess 24 which in cross-section is of inverted V-shape.

Contained in this recess is a helical tension spring 25 which is secured at its upper end to the valve carrier member by means of screws 26 which, as shown, have screw-threaded connection with the member, the ends of the screws extending between the two upper coils of the spring. The lower end of the spring 25 is secured to the washer-like disc valve 27 by means of an annular clip 28 which is preferably welded to the valve 27 and crimped about the bottom coil of the spring. This spring acts at all times to bias the valve toward its seated position.

Radially inward of the mouth of the recess 24 and centrally of the inlet valve assemblage there is provided a flat annular valve seat 29 and radially outward of the recess there is provided a flat annular valve seat 30 which is concentric with the valve seat 29.

Secured to the center of the bottom surface of the carrier member 6 by a stud 31 and nut 32 is an annular valve stop member 33 which arrests downward movement of the valve 27. Clamped between this stop member and the carrier member is an annular gasket 34 for preventing leakage of fluid from the compression chamber 14 to the chamber 12 when the valve 27 is seated during the upward movement of the piston.

The stop member 33 projects downwardly from the lower surface of the valve carrier member 6 through the opening in the valve 27 and terminates below the valve in a horizontally disposed annular supporting flange 35 upon which the valve may rest. This flange is provided with a diametric slot 36 which serves as a fluid inlet passage at the inner periphery of the valve 27.

According to one feature of the invention, there is formed in that part of the upper end of the piston 3 which is nearest the inlet valve 27 when the piston is at the top of its stroke a semi-circular channel 37 which is disposed in a vertical plane and in which there is mounted a semi-circular permanent magnet 38 with the poles thereof facing upwardly in such a manner that the center of flux density of the magnet passes through diametrically opposite portions of the valve 27. The magnet is secured in this position to the piston by a screw 39 which has threaded engagement with the piston at a point below the channel 37.

That part of the piston 3 which is nearest the discharge valve 16 when the piston is at the top of its stroke is provided with a frusto-conical portion 41 in which a similar permanent magnet 42 is mounted in a manner similar to that of magnet 38. The radius of the semi-circle described by this magnet is smaller, however, corresponding to the reduced size of the discharge valve 16 as compared with that of the inlet valve 27.

It should be understood that the magnet 38 does not unseat the valve 27 against the force of the spring 25 and fluid pressure in the compression chamber, but does exert a downward pull on the valve and thereby ensures the unseating of the valve more promptly, after the piston has started its downward stroke, than has heretofore been the case. Also, the magnet 42 assists the spring 23 in seating the valve 15 promptly at the top of the piston stroke.

In operation, when the piston 3 reaches the top of its stroke the valves will be positioned as shown in the accompanying drawing. The valve 27 will have been closed at the beginning of the upward stroke by the force of the fluid in the compression chamber 14 and will for the same reason have remained closed throughout the upward stroke of the piston. The valve 16 will have been closed when the piston reached the end of its upward stroke by the combined downwardly directed forces of the spring 23 and the magnet 42 acting thereon.

In this position, the upwardly directed force of the spring 25 on the valve 27 will be opposed and a little more than offset by the force of the magnet 38. However, when the piston starts its downward stroke the valve 27 will be retained in its seated position by the fluid pressure in the compression chamber until the fluid therein is expanded and the pressure reduced to substantially atmospheric pressure. When the valve 27 is unseated, fluid will flow through the inlet passage 10 to the chamber 9, thence to chamber 12 by way of apertures 11, through passages 13 to recess 24 and past the outer periphery of the valve 27 within compression chamber 14. Inlet fluid will also flow past portions of the inner periphery of said valve and through the slot 36 in the valve stop member 35 within the compression chamber.

It should be noted, that, since the clearance volume in the compression chamber is reduced to a minimum, the pressure therein will reduce to substantially atmospheric pressure with very little downward movement of the piston and, consequently, the valve 27 will still be within the magnetic field of the magnet 38. With the magnet counteracting the force of the spring 25, it will require very little if any inlet fluid pressure to unseat the valve 27.

The pressure of the inlet fluid will maintain the valve 27 unseated during the remainder of the downward stroke of the piston.

When the piston reaches the bottom of its downward stroke, pressure of fluid will be the same on both sides of the valve 27, and the influence of the magnet thereon will be negligible, so that the spring 25 will act to move the valve 27 into sealing engagement with the valve seats 29 and 30.

As the piston starts in its upward stroke, the fluid in the compression chamber 14 will be compressed until its pressure exceeds that of the fluid in chamber 19 and recess 22. At this time the effect of magnet 42 on the valve 16 will be negligible and the valve will open communication to a suitable receiver, not shown. Fluid will flow past the periphery of valve 16 into the chamber 19 and thence to the discharge pipe 20.

At the top of the piston stroke, the magnet 42 will again become effective to assist in seating the valve 16 and closing the communication from the compression chamber to the discharge chamber 19 promptly.

Having now described my invention, what I claim as new and desire to secure by Letters Patent, is:

1. In a fluid compressor of the type having a fluid compression chamber, a fluid conducting communication connected to said chamber, and a piston reciprocable in said chamber to effect a flow of fluid through said communication, in combination, a valve having two control positions and operable from one of said positions to the other to control the flow of fluid through said communication, and means for accelerating the action of said valve, said means comprising a permanent magnet carried by said piston and effective while said valve is in one control position to bias said valve toward its other control position.

2. In an valve arrangement for a fluid compressor of the type having a fluid compression chamber, a fluid conducting communication connected to said chamber, and a piston reciprocable in said chamber to effect a flow of fluid through said communication, in combination, a valve for controlling said communication, and a magnet carried by said piston exerting a control force on said valve during at least a portion of the traverse of said piston.

3. In a fluid compressor of the type having a chamber in which a piston is reciprocated for compressing fluid and a fluid inlet communication to said chamber, in combination, a fluid inlet valve opening and closing said communication and a permanent magnet carried by said piston effective through a certain zone of traverse of the piston to exert a force on said valve in the direction to open said communication.

4. In a fluid compressor of the type having a chamber in which a piston is reciprocated for compressing fluid and a fluid discharge communication from said chamber, in combination, a fluid discharge valve opening and closing said communication and a permanent magnet carried by said piston effective through a certain zone of traverse of the piston to exert a force on said valve in the direction to close said communication.

5. In a fluid compressor of the type having a fluid compression chamber, a fluid inlet communication to said chamber, a fluid discharge communication from said chamber and a piston reciprocable in said chamber to effect the flow of fluid through said communications, in combination, an inlet valve for opening and closing said inlet communication, a discharge valve for opening and closing said discharge communication, and magnet means carried by said piston and effective during at least a portion of the traverse of said piston to exert a force on said discharge valve in the direction to close said discharge communication and to exert a force on said inlet valve in the direction to open said inlet communication.

6. In a fluid compressor of the type having a fluid compression chamber, a fluid inlet communication to said chamber, a fluid discharge communication from said chamber and a piston reciprocable in said chamber to alternately effect a flow of fluid through said communications, in combination, a discharge valve controlling said discharge communication, a magnet carried by said piston and effective during a certain zone of traverse of the piston to exert a force on said discharge valve in the direction to close said discharge communication, an inlet valve controlling said inlet communication, and another magnet carried by said piston effective during a similarly located zone of traverse of the piston to exert a force on said inlet valve in the direction to open said inlet communication.

PHILIP L. CRITTENDEN.

REFERENCES CITED

The following references are of record in the file of this patent:

UNITED STATES PATENTS

| Number | Name | Date |
|---|---|---|
| 337,803 | Worth | Mar. 9, 1886 |
| 348,606 | Worth | Sept. 7, 1886 |
| 457,762 | Dittmar et al. | Aug. 11, 1891 |
| 2,302,847 | Ferguson | Nov. 24, 1942 |